(12) United States Patent
Hiraki et al.

(10) Patent No.: US 10,775,650 B2
(45) Date of Patent: Sep. 15, 2020

(54) OPTICAL MODULATOR

(71) Applicant: NIPPON TELEGRAPH AND TELEPHONE CORPORATION, Tokyo (JP)

(72) Inventors: Tatsurou Hiraki, Tokyo (JP); Shinji Matsuo, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/327,259

(22) PCT Filed: Aug. 25, 2017

(86) PCT No.: PCT/JP2017/030468
§ 371 (c)(1),
(2) Date: Feb. 21, 2019

(87) PCT Pub. No.: WO2018/043317
PCT Pub. Date: Mar. 8, 2018

(65) Prior Publication Data
US 2019/0187494 A1      Jun. 20, 2019

(30) Foreign Application Priority Data

Aug. 29, 2016   (JP) .................................. 2016-166518

(51) Int. Cl.
*G02F 1/025*     (2006.01)
*G02F 1/015*     (2006.01)
*G02F 1/225*     (2006.01)

(52) U.S. Cl.
CPC ...... *G02F 1/025* (2013.01); *G02F 2001/0152* (2013.01); *G02F 2202/101* (2013.01); *G02F 2202/102* (2013.01)

(58) Field of Classification Search
CPC ............... G02F 1/025; G02F 1/2257; G02F 2001/0152; G02F 2001/063;
(Continued)

(56) References Cited

U.S. PATENT DOCUMENTS

| | | | |
|---|---|---|---|
| 5,331,655 A | * 7/1994 | Harder | B82Y 20/00 372/45.01 |
| 2004/0208454 A1 | 10/2004 | Montgomery et al. | |

(Continued)

FOREIGN PATENT DOCUMENTS

| | | |
|---|---|---|
| CA | 2519672 A1 | 10/2004 |
| CA | 2557509 A1 | 9/2005 |

(Continued)

OTHER PUBLICATIONS

Office Action received for Japanese Patent Application No. 2018-537218, dated May 21, 2019, 8 pages (4 pages of English Translation and 4 pages of Office Action).

(Continued)

*Primary Examiner* — Ryan A Lepisto
*Assistant Examiner* — Erin D Chiem
(74) *Attorney, Agent, or Firm* — Womble Bond Dickinson (US) LLP

(57) ABSTRACT

An optical modulator includes a p-type first semiconductor layer (102) formed on a clad layer (101), an insulating layer (103) formed on the first semiconductor layer (102), and an n-type second semiconductor layer (104) formed on the insulating layer (103). The first semiconductor layer (102) is made of silicon or silicon-germanium, and the second semiconductor layer (104) is formed from a III-V compound semiconductor made of three or more materials.

7 Claims, 2 Drawing Sheets

(58) Field of Classification Search
CPC ......... G02F 2202/101; G02F 2202/102; G02F 2202/105

See application file for complete search history.

(56) References Cited

U.S. PATENT DOCUMENTS

| | | | |
|---|---|---|---|
| 2005/0189591 A1* | 9/2005 | Gothoskar | G02B 6/12004 257/347 |
| 2013/0301975 A1 | 11/2013 | Spann et al. | |
| 2015/0055910 A1 | 2/2015 | Liang | |
| 2016/0291350 A1 | 10/2016 | Fujikata et al. | |
| 2017/0212368 A1 | 7/2017 | Liang et al. | |

FOREIGN PATENT DOCUMENTS

| | | |
|---|---|---|
| CN | 1764863 A | 4/2006 |
| CN | 101142505 A | 3/2008 |
| CN | 104969103 A | 10/2015 |
| EP | 0575684 A1 | 12/1993 |
| EP | 1613991 A2 | 1/2006 |
| EP | 1743376 A2 | 1/2007 |
| EP | 2845041 A1 | 3/2015 |
| JP | 2006-515082 A | 5/2006 |
| JP | 2007-525711 A | 9/2007 |
| JP | 4820649 B2 | 11/2011 |
| JP | 4847436 B2 | 12/2011 |
| JP | 2014-126728 A | 7/2014 |
| KR | 10-2005-0114696 A | 12/2005 |
| KR | 10-2015-0006419 A | 1/2015 |
| TW | 201346379 A | 11/2013 |
| WO | 2004/088394 A2 | 10/2004 |
| WO | 2005/082091 A2 | 9/2005 |
| WO | 2013/062096 A1 | 5/2013 |
| WO | 2013/165376 A1 | 11/2013 |
| WO | 2014/155450 A1 | 10/2014 |
| WO | 2016/018285 A1 | 2/2016 |

OTHER PUBLICATIONS

Liang et al., "A Tunable Hybrid III-V-on-Si MOS Microring Resonator with Negligible Tuning Power Consumption", Optical Fiber Communications Conference and Exhibition, 2016, 3 pages.

International Search Report and Written Opinion received for PCT Patent Application No. PCT/JP2017/030468, dated Nov. 7, 2017, 14 pages (7 pages of English Translation and 7 pages of Original Document).

International Preliminary Report on Patentability received for PCT Patent Application No. PCT/JP2017/030468, dated Mar. 14, 2019, 12 pages (7 pages of English Translation and 5 pages of Original Document).

Hong et al., "A Selective-Area Metal Bonding InGaAsP-Si Laser", IEEE Photonics Technology Letters, vol. 22, No. 15, Aug. 1, 2010, pp. 1141-1143.

Office Action received for Japanese Patent Application No. 2018-537218, dated Nov. 19, 2019, 10 pages (5 pages of English Translation and 5 pages of Office Action).

Fang et al., "Hybrid silicon evanescent devices", Materials Today, vol. 10, No. 7-8, Jul.-Aug. 2007, pp. 28-35.

Supplementary European Search Report and Search Opinion received for EP Patent Application No. 17846322.0, dated Mar. 19, 2020, 7 pages.

Chen et al., "Electrically Pumped Room-Temperature Pulsed InGaAsP-Si Hybrid Lasers Based on Metal Bonding", Chinese Physics Letters, vol. 26, No. 6, Jun. 2009, pp. 064211-1-064211-3.

Office Action received for Canadian Patent Application No. 3034236, dated Feb. 28, 2020, 6 pages.

* cited by examiner

OPTICAL MODULATOR

TECHNICAL FIELD

The present invention relates to a charge-accumulation-type optical modulator using a MOS structure consisting of compound semiconductors.

BACKGROUND ART

Technology of integrating compound semiconductor elements on a silicon-on-insulator (SOI) substrate utilized as a communication optical device is attracting more attention. Particularly, technology of integrating a laser and an optical modulator is important as to dramatically increase integration density of communication devices and to reduce the cost. For an optical modulator that needs higher speed and efficiency, a charge-accumulation-type optical modulator with a MOS structure including an n-type InP layer and a p-type Si layer with little optical loss has potential to achieve those needs (see non-patent literature 1).

As shown in FIG. 4, this optical modulator is formed from a p-type silicon layer 402 formed on a buried insulating layer 401, an insulating layer 403 formed on the p-type silicon layer 402, and an n-type InP layer 404 formed on the insulating layer 403. A p-electrode 405 is connected to the p-type silicon layer 402, and an n-electrode 406 is connected to the n-type InP layer 404. The buried insulating layer 401 functions as a clad. The p-type silicon layer 402 is formed by patterning an SOI layer 411 on the buried insulating layer 401. An air groove 412 is formed in a side portion of the p-type silicon layer 402 on the formation side of the n-electrode 406 with the SOI layer 411. The upper surface of the n-type InP layer 404, which is not covered with the n-electrode 406, is open to a space.

Part of the p-type silicon layer 402 and part of the n-type InP layer 404 are arranged so as to overlap each other in a planar view, and form an optical waveguide portion where light to be modulated is guided. In this optical waveguide portion, the insulating layer 403 is sandwiched between the p-type silicon layer 402 and the n-type InP layer 404 in a stacking direction. Light to be modulated is confined in a light confinement portion including clad regions consisting of buried insulating layer 401, the air groove 412, an upper space, and the like, thereby forming a waveguide mode 421.

In this optical modulator, by modulating the concentration of majority carriers accumulated at the interfaces between the p-type silicon layer 402 and the n-type InP layer 404 with the insulating layer 403 in the optical waveguide portion, the refractive indices of the p-type silicon layer 402 and the n-type InP layer 404 in the optical waveguide portion are modulated. In this structure, an improvement in modulation efficiency is expected to be about two to three times greater, as compared to a case in which Si is used for an n-type layer.

RELATED ART LITERATURE

Non-Patent Literature

Non-Patent Literature 1: D. Liang et al., "A Tunable Hybrid III-V-on-Si MOS Microring Resonator with Negligible Tuning Power Consumption", Optical Fiber Communication Conference 2016, Th1K.4, 2016.

DISCLOSURE OF INVENTION

Problem to be Solved by the Invention

However, the above-described technology has a problem that it is not easy to achieve further improvement in modulation efficiency. To improve modulation efficiency, it is important to increase a carrier-induced refractive index change (carrier plasma effect). In addition, to improve modulation efficiency, it is important to further increase the action (influence) of generated carriers on guided light. In theory, the carrier-induced refractive index change can be further increased by reducing the effective mass of a compound semiconductor and increasing the band filling effect. Furthermore, it is possible that the greater action of the carriers on the guided light is achieved by increasing a light confinement coefficient.

In fact, however, InP that is used in the conventional technology and forming the InP layer is a stoichiometrically stable composition, and has a uniquely decided crystal structure. Therefore, the material physical properties such as the effective mass and refractive index cannot be adjusted. According to the above-described two factors, it is extremely difficult to improve modulation efficiency.

The present invention has been made in consideration of the above problems, and has as its object to further improve the modulation efficiency of a charge-accumulation-type optical modulator with a MOS structure.

Means of Solution to the Problem

According to the present invention, there is provided an optical modulator including a p-type first semiconductor layer made of one of silicon and silicon-germanium formed on a clad layer, an insulating layer formed on the first semiconductor layer, an n-type second semiconductor layer formed from a III-V compound semiconductor made of at least three materials formed on the insulating layer, a first electrode connected to the first semiconductor layer, and a second electrode connected to the second semiconductor layer, wherein part of the first semiconductor layer and part of the second semiconductor layer are arranged so as to overlap each other via the insulating layer in a planar view, and form an optical waveguide portion where light to be modulated is guided in a direction parallel to a plane of the clad layer, and the light waveguide portion satisfies a single mode condition.

In the optical modulator, the first electrode is formed on a region of the first semiconductor layer where the optical waveguide portion is not being formed.

In the optical modulator, the second semiconductor layer is formed from stacked multiple compound semiconductor layers, and among the plurality of compound semiconductor layers, the compound semiconductor layer closer to the insulating layer has a smaller band gap energy.

In the optical modulator, the first semiconductor layer is formed from stacked multiple semiconductor layers, and among the plurality of semiconductor layers, the semiconductor layer closer to the insulating layer has a smaller bandgap energy.

Effect of the Invention

As described above, according to the present invention, since an n-type second semiconductor layer is formed by a III-V compound semiconductor made of three or more materials, it is possible to obtain an excellent effect capable of further improving the modulation efficiency of a charge-accumulation-type optical modulator with a MOS structure.

BEST MODE FOR CARRYING OUT THE INVENTION

Embodiments of the present invention will be described below with reference to the accompanying drawings.

[First Embodiment]

Figure 1:
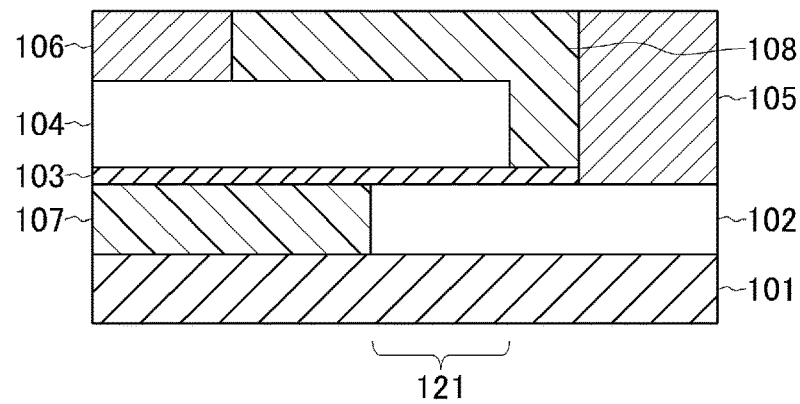
FIG. 1 is a sectional view showing the arrangement of an optical modulator according to the first embodiment of the present invention.
Figure 2:
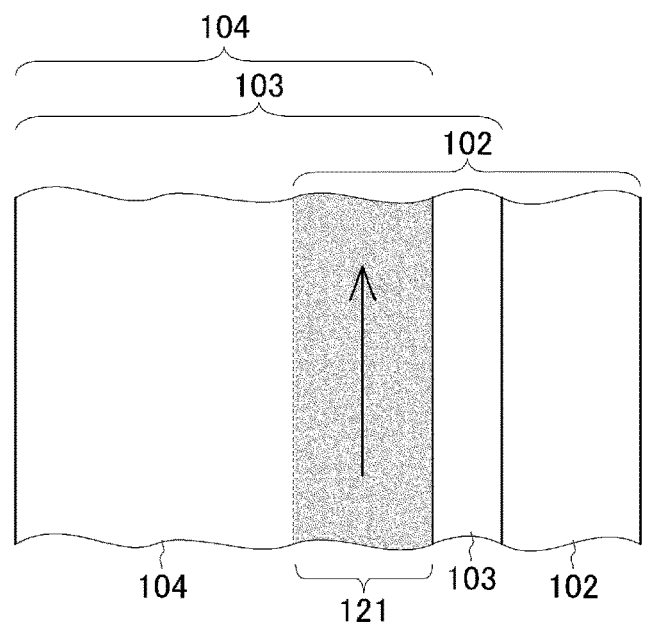
FIG. 2 is a plan view showing the partial arrangement of the optical modulator according to the first embodiment of the present invention.

The first embodiment of the present invention will be described with reference to FIGS. 1 and 2. FIG. 1 is a sectional view showing the arrangement of an optical modulator according to the first embodiment of the present invention. FIG. 2 is a plan view showing the partial arrangement of the optical modulator according to the first embodiment of the present invention.

The optical modulator includes a p-type first semiconductor layer 102 formed on a clad layer 101, an insulating layer 103 formed on the p-type first semiconductor layer 102, and an n-type second semiconductor layer 104 formed on the insulating layer 103. The first semiconductor layer 102 is made of silicon or silicon-germanium. The second semiconductor layer 104 is formed from a compound semiconductor made of three or more materials. The second semiconductor layer 104 is made of, for example, InGaAsP. Furthermore, the optical modulator includes a first electrode 105 connected to the first semiconductor layer 102 and a second electrode 106 connected to the second semiconductor layer 104.

Part of the first semiconductor layer 102 and part of the second semiconductor layer 104 are arranged so as to overlap each other in a planar view, and forming an optical waveguide portion 121 where light to be modulated is guided in a direction parallel to the plane of the clad layer 101. That is, the insulating layer 103 is sandwiched between the first semiconductor layer 102 and the second semiconductor layer 104 in the stacking direction of the optical waveguide portion 121.

Note that in the first embodiment, an insulating layer 107 is formed in a region on the clad layer 101 on the formation side of the second electrode 106. A side portion of the insulating layer 107 is in contact with a side portion of the first semiconductor layer 102. An insulating layer 108 is formed on the second semiconductor layer 104. The insulating layers 107 and 108 function as clads, and serve as, together with the clad layer 101, a function of confining light in a region surrounded by the insulating layers in a sectional view.

The optical waveguide portion 121 extends in the optical waveguide direction indicated by an arrow in the plan view of FIG. 2. Note that FIG. 2 does not illustrate the first electrode 105, the second electrode 106, and the insulating layer 108. In the first embodiment, with respect to the optical waveguide portion 121, the first semiconductor layer 102 extends in one direction, and the second semiconductor layer 104 extends in the other direction. In a region where no insulating layer 103 is formed, that is, the region contained in a region extending from the optical waveguide portion 121 of the first semiconductor layer 102, the first electrode 105 forms an ohmic connection with the surface of the first semiconductor layer 102. The second electrode 106 forms an ohmic connection with the surface of the region extending from the optical waveguide portion 121 of the second semiconductor layer 104. No electrode is arranged in the region of the optical waveguide portion 121 in a planar view. In other words, the first electrode 105 is formed in a region on the first semiconductor layer 102 where the optical waveguide portion 121 is not being formed.

To form a waveguide mode in the optical waveguide portion 121, the optical waveguide portion 121 satisfies a single mode condition. In the optical waveguide portion 121, majority carriers are accumulated at the interfaces between the first semiconductor layer 102 and the second semiconductor layer 104 with the insulating layer 103. Therefore, the thickness of the first semiconductor layer 102 and that of the second semiconductor layer 104 are appropriately set so that the center of an optical waveguide mode field is arranged in these portions, that is, the interfaces between the first semiconductor layer 102 and the second semiconductor layer 104 with the insulating layer 103.

A method of manufacturing the optical modulator according to the embodiment will be briefly described below. The first semiconductor layer 102 is, for example, formed on the clad layer 101 by using a well-known SOI substrate, setting a buried insulating layer as the clad layer 101, and patterning a surface silicon layer by a known lithography technique and etching technique.

Next, the insulating layer 107 is formed adjacent to the first semiconductor layer 102 on the clad layer 101. The insulating layer 107 is made of, for example, silicon oxide, silicon oxynitride, aluminum oxide, or the like. The insulating layer 107 is formed in a planarized state so that its surface is arranged to be flush with the surface of the first semiconductor layer 102. Next, the insulating layer 103 is formed on the first semiconductor layer 102 and the insulating layer 107. The insulating layer 103 is made of, for example, silicon oxide, silicon oxynitride, aluminum oxide, or the like. Note that an air groove may be formed between the first semiconductor layer 102 and the insulating layer 107.

On the other hand, an InGaAsP layer with a predetermined composition ratio is epitaxially grown on a growth substrate made of InP by well-known metal-organic chemical vapor deposition. The grown InGaAsP layer is bonded onto the above-described insulating layer 103. After that, the growth substrate is removed. Then, the second semiconductor layer 104 is formed by patterning the InGaAsP layer formed on the insulating layer 103 by the known lithography technique and etching technique.

Next, the surface of the first semiconductor layer 102 is exposed by forming an opening in the insulating layer 103 at a location where the first electrode 105 is formed, and the first electrode 105 is formed there. The first electrode 105 is made of, for example, Ti. The second electrode 106 is formed on the second semiconductor layer 104. The second electrode 106 is made of, for example, AuGeNi. Each electrode is formed by, for example, a well-known lift-off method. Furthermore, the insulating layer 108 is formed on the second semiconductor layer 104 and the insulating layer 103. Note that the insulating layer 108 need not always be formed, and an air layer may be used instead. However, by forming the insulating layer 108, the second semiconductor layer 104 can be protected from the surrounding environment.

According to the first embodiment, since the second semiconductor layer 104 is formed by a compound semiconductor made of three or more materials, it is possible to improve the modulation efficiency of the optical modulator, as will be described below.

The effective mass and refractive index of a ternary or quaternary compound semiconductor can be controlled by controlling a composition. It is possible to improve light confinement and a carrier-induced refractive index change.

For example, the relationship between a composition y and a band gap energy Eg of $In_{1-x}Ga_xAs_yP_{1-y}$ is given by:

$$Eg=1.344-0.738y+0.138y^2$$

As is well known, a refractive index change induced by current injection in a semiconductor has the carrier plasma effect, band filling effect, and band gap reduction effect. In consideration of these effects, when an electron concentration is changed by $2\times10^{18}$ cm$^{-3}$, the refractive index of InP changes by 0.0094. Conversely, when the electron concentration is changed by $2\times10^{18}$ cm$^{-3}$, the refractive index of $In_{1-x}Ga_xAs_yP_{1-y}$ with Eg=0.95 eV changes by 0.013, the refractive index of $In_{1-x}Ga_xAs_yP_{1-y}$ with Eg=0.92 eV changes by 0.0145, and the refractive index of $In_{1-x}Ga_xAs_yP_{1-y}$ with Eg=0.89 eV changes by 0.016.

Note that $In_{1-x}Ga_xAs_yP_{1-y}$ with Eg=0.95 eV has a band gap wavelength λ of 1.3 μm, $In_{1-x}Ga_xAs_yP_{1-y}$ with Eg=0.92 eV has a band gap wavelength λ of 1.35 μm, and $In_{1-x}Ga_xAs_yP_{1-y}$ with Eg=0.89 eV has a band gap wavelength λ of 1.4 μm.

As for $In_{1-x}Ga_xAs_yP_{1-y}$, as the band gap energy decreases by changing the composition ratio, a carrier-induced refractive index change increases to be greater than that of InP of a binary material.

In general, as for $In_{1-x}Ga_xAs_yP_{1-y}$, as the band gap energy decreases, the refractive index increases. The light confinement effect in the optical waveguide portion 121 increases by using a material with a high refractive index for the second semiconductor layer 104 forming the optical waveguide portion 121, thereby making it possible to strengthen the light intensity (distribution) in the optical waveguide portion 121. As a result, majority carriers generated at the interface of the second semiconductor layer 104 with the insulating layer 103 in the optical waveguide portion 121 can be made to more strongly work on light that is guided to the optical waveguide portion 121. Therefore, a multi-component compound semiconductor forming the second semiconductor layer 104 desirably has a composition with a smaller band gap energy.

As described above, by forming the second semiconductor layer 104 from a semiconductor with a smaller band gap energy, it is possible to firstly increase a refractive index change by a carrier concentration change, and secondly increase the influence of the generated carriers on the guided light. Note that to prevent inter-band absorption in the second semiconductor layer 104, the band gap energy needs to be equal to or greater than an energy corresponding to the wavelength of the light to be modulated. For example, when the wavelength of the light to be modulated is 1.55 μm, the band gap energy of the second semiconductor layer 104 needs to be 0.8 eV or greater.

The first semiconductor layer 102 is not always made of silicon, and may be made of a silicon-germanium mixed crystal material with a smaller effective mass. Furthermore, the insulating layer 103 is thinned to implement a desired capacity of the CR time constant within a range in which dielectric breakdown resistance and tunnel current prevention performance are obtained.

[Second Embodiment]

Figure 3:
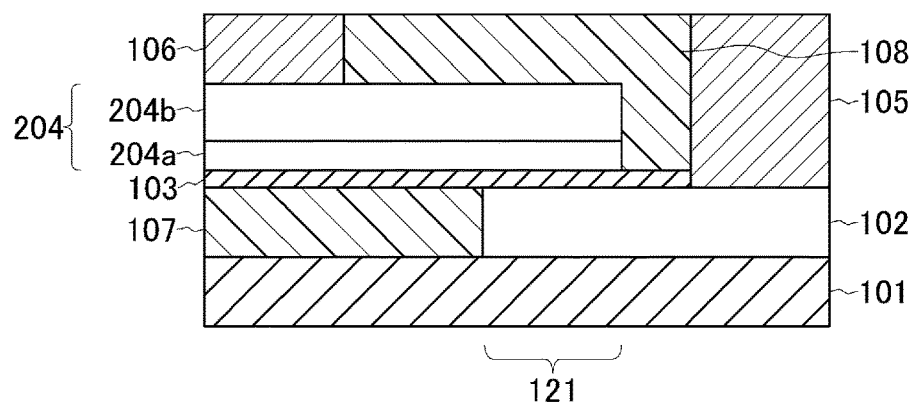
FIG. 3 is a sectional view showing the arrangement of an optical modulator according to the second embodiment of the present invention.
Figure 4:
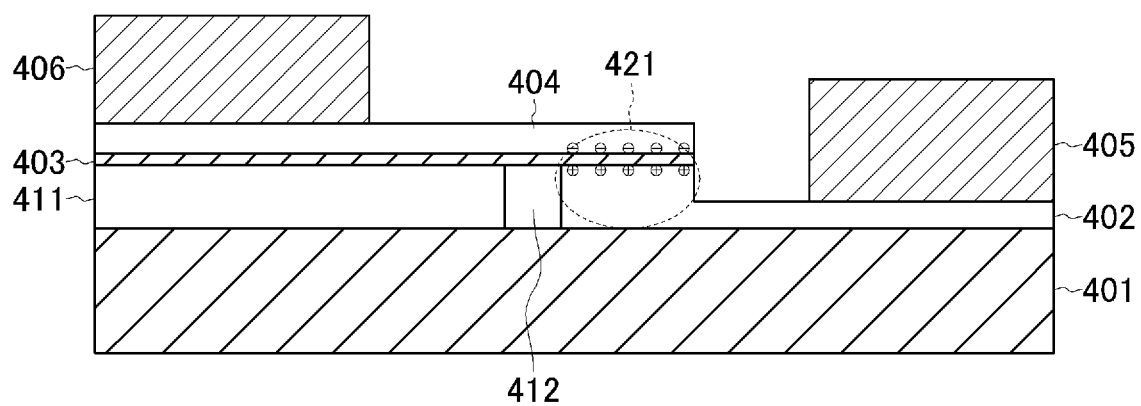
FIG. 4 is a sectional view showing the arrangement of a conventional charge-accumulation-type optical modulator with a MOS structure.

The second embodiment of the present invention will be described with reference to FIG. 3. FIG. 3 is a sectional view showing the arrangement of an optical modulator according to the second embodiment of the present invention.

The optical modulator includes a p-type first semiconductor layer 102 formed on a clad layer 101, an insulating layer 103 formed on the first semiconductor layer 102, and an n-type second semiconductor layer 204 formed on the insulating layer 103. Furthermore, the optical modulator includes a first electrode 105 connected to the first semiconductor layer 102, and a second electrode 106 connected to the second semiconductor layer 204.

Part of the first semiconductor layer 102 and part of the second semiconductor layer 104 are arranged so as to overlap each other in a planar view, and form an optical waveguide portion 121 where light to be modulated is guided in a direction parallel to the plane of the clad layer 101. That is, the insulating layer 103 is sandwiched between the first semiconductor layer 102 and the second semiconductor layer 104 in the stacking direction of the optical waveguide portion 121.

In the second embodiment, the second semiconductor layer 204 is formed from a plurality of stacked compound semiconductor layers 204a and 204b. The band gap energies of the compound semiconductor layers 204a and 204b are different from each other, and the compound semiconductor layer 204a closer to the insulating layer 103 has a smaller band gap energy. The arrangement other than the second semiconductor layer 204 is the same as in the above-described first embodiment. In the second embodiment as well, the insulating layer 107 is formed adjacent to the first semiconductor layer 102 on the clad layer 101, and the insulating layer 108 is formed on the second semiconductor layer 204.

A region where a refractive index changes by carriers generated at the interfaces of the first semiconductor layer 102 and the second semiconductor layer 204 with the insulating layer 103 in the optical waveguide portion 121 is close to the interfaces of the first semiconductor layer 102 and the second semiconductor layer 204 with the insulating layer 103, at which carriers are accumulated. Therefore, the layer having greater refractive index change and having smaller band gap energy is arranged near the insulating layer 103. As described above, the compound semiconductor layer 204a with the smaller band gap energy is arranged on the side of the insulating layer 103.

This arrangement is characteristic in that the relation between the refractive indices is described as, "compound semiconductor layer 204a>compound semiconductor layer 204b". With this arrangement, a difference in refractive index is generated in the stacking direction in the second semiconductor layer 204. Thus, the light guided in the optical waveguide portion 121 concentrates on the side of the compound semiconductor layer 204a with the higher refractive index, and light is more strongly confined near the interface with the insulating layer 103, at which the carriers are accumulated. As a result, the action of the carriers on the guided light can be increased.

Note that in the second embodiment as well, the thicknesses of the first semiconductor layer 102 and compound semiconductor layers 204a and 204b are set appropriately so that the center of the optical waveguide mode field is arranged in the portion in the optical waveguide portion 121 where majority carriers are accumulated, that is, near the interface of the first semiconductor layer 102 or the second semiconductor layer 204 with the insulating layer 103.

Furthermore, in the second embodiment as well, the first electrode 105 is formed in a region except for the optical waveguide portion 121 on the first semiconductor layer 102, and no electrode is arranged in a region of the optical waveguide portion 121 in a planar view.

As for a compound semiconductor having a smaller band gap, a carrier-induced refractive index change is greater while absorption by the carriers is also greater. Therefore, it is possible to reduce an absorption loss of the guided light by forming the compound semiconductor layer 204b having a smaller loss, in a region not including the periphery of the interface, where carrier accumulation does not occur.

In the second embodiment, the first semiconductor layer 102 is made of silicon or silicon-germanium, the second semiconductor layer 204 has the stacked structure of the compound semiconductor layers 204a and 204b with different band gap energies, and the compound semiconductor layer closer to the insulating layer 103 has the smaller band gap energy. However, similarly to the second semiconductor layer 204, the first semiconductor layer 102 may also have the stacked structure of semiconductor layers with different band gap energies, and may be configured so that the semiconductor layer closer to the insulating layer has a smaller band gap energy. In the first embodiment as well, the first semiconductor layer 102 may have the above-described stacked structure. The band gap and refractive index of the first semiconductor layer 102 can be controlled by a composition of a silicon-germanium mixed crystal material, and it may be possible to obtain the same effect as that described above in the first semiconductor layer.

As described above, according to the present invention, since the n-type second semiconductor layer is formed by the III-V compound semiconductor made of three or more materials, it is possible to further improve the modulation efficiency of the charge-accumulation-type optical modulator with the MOS structure.

Note that the present invention is not limited to the above-described embodiments, and it is obvious that various modifications and combinations can be made within the technical scope of the present invention by those skilled in the art in this field. For example, InGaAsP has been exemplified above. However, the present invention is not limited to this, and the second semiconductor layer may be formed from another ternary or quaternary III-V compound semiconductor. They need not always be crystal.

EXPLANATION OF THE REFERENCE NUMERALS AND SIGNS

101 . . . clad layer, 102 . . . first semiconductor layer, 103 . . . insulating layer, 104 . . . second semiconductor layer, 105 . . . first electrode, 106 . . . second electrode, 107 . . . insulating layer, 108 . . . insulating layer

The invention claimed is:

1. An optical modulator comprising:
a p-type first semiconductor layer made of one of silicon and silicon-germanium formed on a clad layer;
an n-type second semiconductor layer formed from a III-V compound semiconductor made of at least three materials formed on an insulating layer disposed between said first semiconductor layer and said second semiconductor layer;
a first electrode connected to the first semiconductor layer; and
a second electrode connected to the second semiconductor layer,
wherein part of the first semiconductor layer and part of the second semiconductor layer are arranged so as to overlap each other via the insulating layer in a planar view, and form an optical waveguide portion where light to be modulated is guided in a direction parallel to a plane of the clad layer, and
the light waveguide portion satisfies a single mode condition.

2. The optical modulator according to claim 1, wherein the first electrode is formed on a region of the first semiconductor layer where the optical waveguide portion is not being formed.

3. The optical modulator according to claim 1, wherein the second semiconductor layer is formed from a plurality of stacked compound semiconductor layers, and among the plurality of compound semiconductor layers, the compound semiconductor layer closer to the insulating layer has a smaller band gap energy.

4. The optical modulator according to claim 1, wherein the first semiconductor layer is formed from a plurality of stacked semiconductor layers, and among the plurality of semiconductor layers, the semiconductor layer closer to the insulating layer has a smaller bandgap energy.

5. The optical modulator according to claim 2, wherein the second semiconductor layer is formed from a plurality of stacked compound semiconductor layers, and among the plurality of compound semiconductor layers, the compound semiconductor layer closer to the insulating layer has a smaller band gap energy.

6. The optical modulator according to claim 2, wherein the first semiconductor layer is formed from a plurality of stacked semiconductor layers, and among the plurality of semiconductor layers, the semiconductor layer closer to the insulating layer has a smaller bandgap energy.

7. The optical modulator according to claim 3, wherein the first semiconductor layer is formed from a plurality of stacked semiconductor layers, and among the plurality of semiconductor layers, the semiconductor layer closer to the insulating layer has a smaller bandgap energy.

* * * * *